US012792489B2

(12) United States Patent
Arora et al.

(10) Patent No.: US 12,792,489 B2
(45) Date of Patent: Nov. 10, 2026

(54) ISSUE DETECTION AND WORKFLOW SCANNER

(71) Applicant: BrowserStack Limited, Dublin (IE)

(72) Inventors: Lakshay Arora, Bengaluru (IN); Kaustubh Saxena, Ghaziabad (IN); Arpan Jayeshkumar Shukla, Surat (IN); Swaraj Gandhi, Nadiad (IN)

(73) Assignee: BrowserStack Limited, Dublin (IE)

( * ) Notice: Subject to any disclaimer, the term of this patent is extended or adjusted under 35 U.S.C. 154(b) by 271 days.

(21) Appl. No.: 18/732,586

(22) Filed: Jun. 3, 2024

(65) Prior Publication Data

US 2025/0370902 A1 Dec. 4, 2025

(51) Int. Cl.

| | |
|---|---|
| ***G06F 11/3604*** | (2025.01) |
| ***G06F 3/048*** | (2013.01) |
| ***G06F 9/445*** | (2018.01) |
| ***G06F 9/451*** | (2018.01) |
| ***G06F 11/3698*** | (2025.01) |
| ***G06F 16/957*** | (2019.01) |
| ***G06F 40/14*** | (2020.01) |

(52) U.S. Cl.

CPC .......... *G06F 11/3604* (2013.01); *G06F 3/048* (2013.01); *G06F 9/451* (2018.02); *G06F 11/3698* (2025.01); *G06F 16/957* (2019.01); *G06F 40/14* (2020.01); *G06F 9/44526* (2013.01)

(58) Field of Classification Search

CPC ............... G06F 11/079; G06F 11/3409; G06F 11/3604; G06F 11/3698; G06F 2201/865; G06F 2221/033; G06F 8/38; G06F 9/451; G06F 40/14

See application file for complete search history.

(56) References Cited

U.S. PATENT DOCUMENTS

2011/0320880 A1* 12/2011 Wenig ................. G06F 11/3476 714/39
2016/0054985 A1* 2/2016 Cragun ..................... G06F 8/38 715/762
2019/0042397 A1* 2/2019 Vignesh R .......... G06F 11/3692

FOREIGN PATENT DOCUMENTS

EP 3118744 A1 * 1/2017 ......... G06Q 30/0201
JP 2004334655 A * 11/2004

OTHER PUBLICATIONS

Ismailova, Rita, et al., Comparison of Online Accessibility Evaluation Tools: An Analysis of Tool Effectiveness, IEEE Access (vol. 10), May 30, 2022, 7 pages, [retrieved on Apr. 24, 2026], Retrieved from the Internet: < URL:http://ieeexplore.ieee.org/>.*

* cited by examiner

*Primary Examiner* — Geoffrey R St Leger
(74) *Attorney, Agent, or Firm* — Cognition IP, P.C.; Edward Steakley; Saleh Kaihani

(57) ABSTRACT

A website developer can use an issue detector and an issue processor to detect issues with their website and troubleshoot them. A rule engine can parse a single instance of a webpage, frozen in time and generate a single issue report, for example, an accessibility issue report. The website developer can interact with the website, as an end-user would, while the issue detector automatically runs the rule engine in the background, and the issue processor automatically consolidates the issue reports. The issue processor deduplicates the issue reports and performs tagging to generate a combined issue report. The combined issue report can feed one or more user interfaces, allowing the website developer to filter and display the issues with the website.

20 Claims, 9 Drawing Sheets

ISSUE DETECTION AND WORKFLOW SCANNER

BACKGROUND

Field

This invention relates generally to the field of website development and maintenance and more particularly to methods and tools for automatic detection of website issues.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Website developers can use a rule engine to detect issues with their website. For example, an accessibility rule engine can receive an instant of a webpage, frozen in time and output various accessibility rule violations with the website. Examples violations can include not having enough contrast for a UI element, or missing features required by screen readers to function properly. Some rule engines can only run on one snapshot of a website. In other words, they can only process a webpage of a website, frozen at a particular state. These rule engines do not have an ability to parse through all potential states of a website and generate a consolidated report of all the issues found in all states of the website. Modern websites, on the other hand, can assume hundreds of various states. For example, even small user actions, such as scrolling, or hovering the mouse above a website element can trigger a new state of the website as the layout and user interface (UI) of the website changes. In this scenario, the website developer freezes the state of the website by one or more programming techniques, runs the rule engine, and obtains an issue report. The website developer repeats this process for multiple website states, for example, those mirroring an end-user workflow. The issue report from each state would have to be manually combined to obtain an overall issue report for the website.

Furthermore, since each issue report is generated independently from the other reports, manually combining the reports can generate duplication of the same issues. The manually combined report also lacks organization, categorization, or data insight to assist the website developer in triaging the issues and deciding on an efficient troubleshooting approach. Consequently, there is a need for more robust issue detection and processing, providing better tools to website developers and website maintenance personnel.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

DETAILED DESCRIPTION

Figure 1:
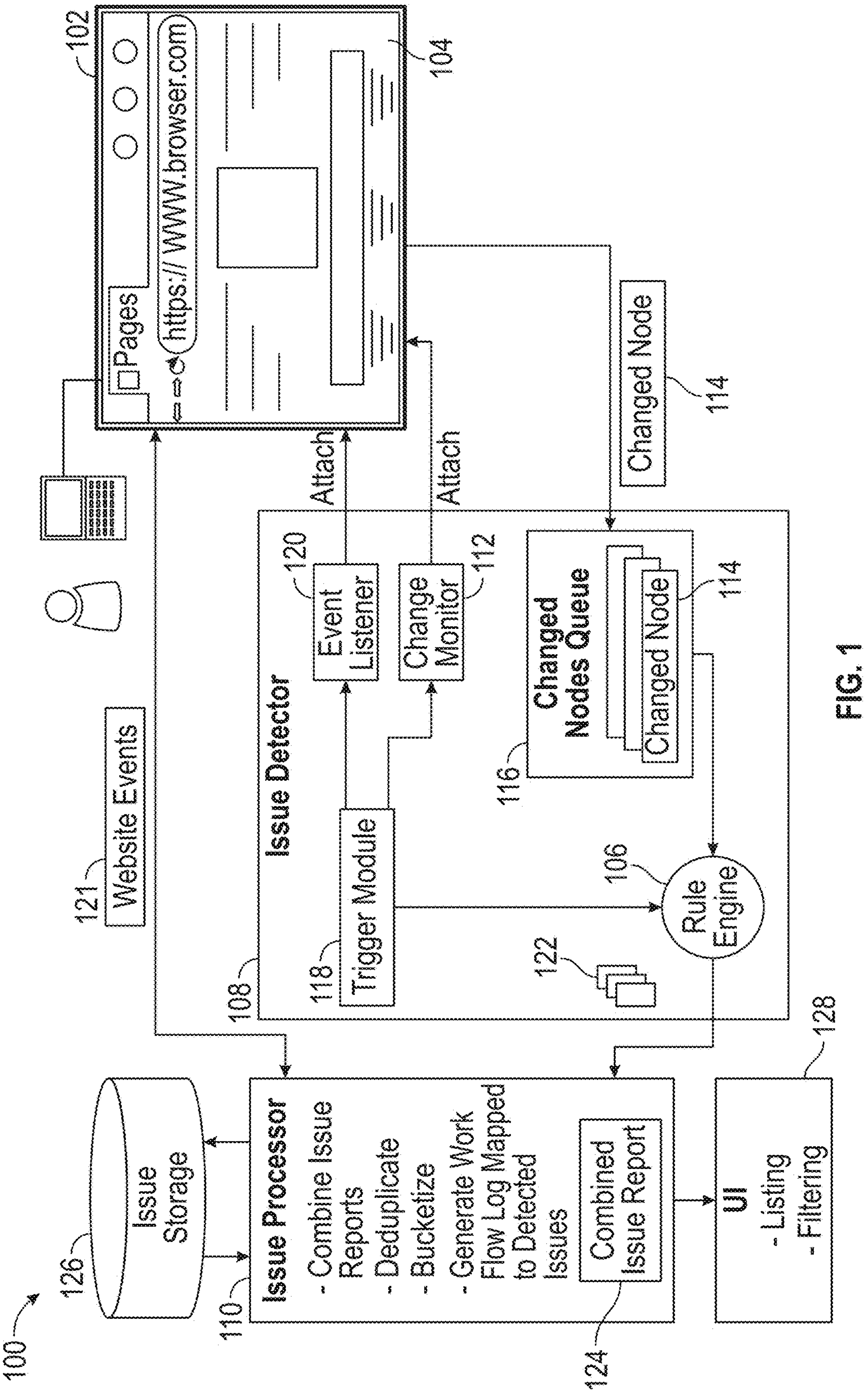
FIG. 1 illustrates an example diagram of the components and the environment in which an issue detector and an issue processor operate according to some embodiments.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Website developers and website administrators are interested in detecting issues with their websites, debugging the issues, and continuously improving the quality of their websites. Issues can arise in a variety of contexts. Examples can include technical issues, optimization-related issues, compliance-related issues, user interface (UI) related issues and many more. In particular, website developers may be interested in verifying the compliance of their website with standard industry-wide practices. For example, website developers can be interested in detecting and troubleshooting accessibility issues, related to a website compliance with legal or industry standards for allowing persons with disability to have access to the website. Website developers can utilize custom-built or industry standard rule engines to test a website and detect various issues. The issues can relate to a variety of topics a developer may wish to test, including for example, accessibility issues, optimization issues, or any programming topic a developer might be interested in testing. Rule engines include programs that compare the behavior and/or a state of a website, in relation to a set of rules, and output a variety of diagnostic reports and messages, when a violation of a rule is detected. In some cases, rule engines can output or otherwise indicate the level of severity of a violation to help the website developer prioritize which issues to debug first.

In relation to some issues, such as accessibility issues, the rule engines operate by parsing and/or monitoring the operations and/or state of a website in relation to some user actions on the website. Furthermore, some rule engines can only run in relation to a particular state of a website. Modern websites can assume numerous states, for example, modern websites can have a multitude of states in terms of their user interfaces and/or their backend parameters in relation to a received user interaction. The state of a website usually changes when the user interacts with the website, for example, by clicking on a link, by hovering the mouse over a portion of the website, by entering text, or by scrolling. User interactions typically cause a change in the user interface display of the website, and/or the underlying or backend parameters of a website. In short, user interactions typically change the state of the website.

Some rule engines can perform their functions only in relation to a single state of a website. In this scenario, the website developer freezes the state of the website, runs the rule engine, and obtains a report or a list of issues detected by the rule engine. A difficulty with this scenario is that the website developer has to reperform the freezing, scanning and obtaining of the issue reports for multiple states of the website. The website developer has to manually combine and consolidate the reports from various states. At the same time, the nature of some issues with a website can be repetitive in the sense that the resolution of multiple issues can be a common solution, or that several issues can share the same root cause. In addition to the burden of performing manual testing, the website developer cannot readily obtain visibility into what issues might be related, for example those that share the same root cause. Consequently, website developers can benefit from an issue detection workflow that does not require them to perform manual operation and report consolidation, such as freezing various website states, performing scans and consolidating issue reports. Preferably, the website developer can trigger the start of a scan and interact with the website as a potential user would, for example, by navigating the website, inputting text, hovering the mouse over various fields, clicking links, or by performing other potential user interactions or user workflow, while an issue detection and processing tool, detects the issues, deduplicates them, categorizes them, based on their root cause, and generates consolidated reports, which can be filtered and viewed in a user interface, such as one or more dashboards. In some embodiments, systems and methods of issue detector and processor can be implemented via a browser extension such as a toolkit, accessible in a developer tab.

FIG. 1 illustrates an example diagram 100 of the components and the environment in which an issue detector 108 and an issue processor 110 operate according to some embodiments. A website developer can use a browser 102 to run a website 104. The website developer can also be administrator or maintenance personnel of the website 104. Running a website can include accessing network and/or online servers, executing website code (e.g., HTML, Python, and/or other code), and rendering a display of the website 104 on a display monitor. A rule engine 106 can be provided by a vendor to the website developer, and/or can be designed and/or programmed by the website developer. In some embodiments, the rule engine 106 may be available from an open-source provider. The rule engine 106 can include program code that when executed, accepts one or more of a webpage, a portion of a webpage, extracted entities, or components of a webpage, as input, verifies compliance of the input with one or more sets of rules and outputs an issue report. The issue report can have a variety of formats. For example, the issue report can include an identification of an element of the webpage along with a description or identification of a violated rule. The rule engine 106 can be provided as part of the issue detector 108, as shown in FIG. 1, but it can also be provided as a backend service, running in a remote server, relative to the server running the issue detector 108. In some embodiments, the rule engine 106 and its related processing and functionality can be distributed between the issue detector 108 (e.g., as a browser extension) and a backend service, running in a remote server, relative to the server running the issue detector 108.

In some embodiments, the website 104 can be represented in a document object model (DOM), where each website element, including the website itself is represented as a DOM node. A node in this context is a website element (e.g., an HTML element). The website can include a plurality of webpages that are available via various navigation menus, where a user can explore. Each node can also include a plurality of sub-nodes. For example, the website 104 can be represented as a node, the webpages of the website 104 can also be nodes, albeit the sub-nodes of the website 104.

An issue detector 108 can include the rule engine 106. The rule engine 106 in some implementations may only be capable of running asynchronously, where the rule engine 106 only can process one state of the website at a time. A state of the website, in this context, refers to a node (and its sub-nodes) frozen in time. A website can include numerous states, depending on the user interactions received, backend and frontend operations of the website and the user interfaces that the browser 102 generates for a website. When the user clicks on a link, hovers the mouse over a link, accesses a dropdown menu, or performs any action on the website, the state of the website and the website nodes can change. The changes are reflected in the DOM representation of the website as DOM changes.

In some embodiments, the rule engine 106 can scan a single state of the website and can generate an issue report, corresponding to that state. The issue report can include a listing of the rule violations, as well as the website elements, where the rule violation was detected. In this scenario, to obtain the issue report for a different state of the website, the developer has to modify the state of the website, freeze the state of the website, and run the rule engine 106 to obtain an issue report corresponding to the modified website state. The website developer has to manually perform these operations for other states of the website, manually save the issue reports and combine them. The manual process of obtaining and combining the issue reports can become cumbersome and error prone when the website developer wishes to test multiple user workflows, corresponding to hundreds of webpage states. Furthermore, the issue reports obtained by the manual process can include multiple repetitive elements. For example, in modern webpages, some user interactions cause only a partial change in the UI of the website, while the remaining elements of a website remain unchanged. When a user hovers her mouse over various elements of a website, multiple states of the website can be generated, but the majority of the generated states in this manner include the same UI elements, with only changes occurring in the area, where the user is hovering a mouse pointer. Nevertheless, the rule engine 106, when run manually on each state, generates a separate issue report for each state, with the same rule violation flagged for all common website elements, shared between the different states. In this scenario, each issue report can contain multiple identical issues. In other words, the issue reports contain substantial duplicative entries, relative to one another. When combining the reports, the website developer is presented with many duplicative elements, slowing down the review and troubleshooting, when a manually combined issue report is used. Some embodiments include deduplication to reduce or eliminate duplicative entries in an automatically generated combined issue report.

Similarly, the manually combined issue reports can lack organization and categorization that can alert the developer to the root cause of the various issues in an issue report. For example, several website issues can relate to a single website component. Troubleshooting one website component can resolve issues related to that component anywhere the component is used in building the website. Some embodiments can include bucketizing the issues in the issue report, based on website components. For example, embodiments directed to component tagging can include bucketizing the issues in a combined report, based on website components. In some embodiments, consolidating the issues, based on website component can yield a count of the number of issues related to a component. The website developer can utilize the count to prioritize troubleshooting the components, whose issue resolution results in the greatest drop in the number of issues of the website or webpage as a whole.

The issue detector 108 and issue processor 110 can enable a website developer to interact with the website 104, as an end-user would, while the issue detector 108 and issue processor 110, automatically run the rule engine 106 in the background, and generate a combined report. In some embodiments, the issue detector 108 can attach a change monitor 112 to the browser 102, for example in the form of a browser extension. The change monitor 112 can monitor the website 104 and detect a change of state in the website 104. The change of state can occur due to a variety of inputs from a user, such as scrolling, clicking on links, hovering, or due to other frontend and/or backend operations of the website. In some embodiments, the change monitor 112 detects a change in the state of the website 104, by detecting a DOM change, or a DOM node change in the website 104. Changed nodes 114 can be sent to a changed nodes queue 116. Each node can represent a state of the website frozen in time.

A trigger module 118 can receive a start scan message from a website developer, upon receiving the start scan message, the trigger module 118 can trigger the change monitor to begin monitoring the website 104 and populating the changed nodes queue 116. The trigger module 118 can also trigger the rule engine 106 to begin processing the jobs queued up in the changed nodes queue 116. The rule engine 106 can scan each changed node 114, corresponding to a single state of the website at a time, and can output an issue report 122 to the issue processor 110. In some embodiments, the rule engine 106 can be designed to process more than a single changed node 114, corresponding to multiple states of the website, during a single operation run. In other embodiments, a single operation run of the rule engine 106 only processes a single changed node 114, and generates a single issue report 122 corresponding to a single state of the website 104.

In some embodiments, the issue detector 108 can also attach an event listener 120 to the browser 102. The event listener 120 can capture a chronological log of events occurring at the website 104. The event listener 120 can also be triggered by the trigger module 118. In some embodiments, the trigger module 118 triggers the rule engine 106, as soon as a changed node 114 is populated in the changed nodes queue 116, where the rule engine 106, thereby, can run continuously as more changed nodes 114 are populated in the queue. In some embodiments, the trigger module 118 triggers rule engine 106, immediately upon receipt of a start scan message, received from the developer, where the rule engine 106 polls the changed nodes queue on a predetermined interval, to detect any instance of a changed node 114 appearing in the changed nodes queue. Alternatively, the trigger module 118 can allow the queue to buffer a predetermined number of changed nodes 114 before it triggers the operation of the rule engine 106. Other implementations of the triggered module 118 can also be used.

The issue processor 110 can receive the issue reports 122 from the rule engine 106, where each issue report 122 corresponds to a changed node 114. The issue processor 110 can continuously combine the issue reports 122 and can generate a combined issue report 124. The issue processor 110 can also continuously update the combined issue report 124, as more issue reports 122 are generated by the rule engine 106. In the combined issue report, the issue processor 110 can deduplicate identical issues, and bucketize each issue, based on a corresponding website component. When the event listener 120 is used, the issue processor 110 can receive website events 121 and can generate a workflow log, mapped to issues detected by the rule engine 106. The workflow log can include user interactions on the website 104, along with the responses of the website 104, and other events of the website 104. The workflow log, mapped to issues, can be used to determine when, where and how an issue was detected, relative to a user workflow. The issue processor 110 can use an issue storage 126 to store its output. The issue processor 110 can provide a backend for UI 128, which the developer can use to view various reports, and filter the output of the issue processor 110, to generate additional reports.

Figure 2:
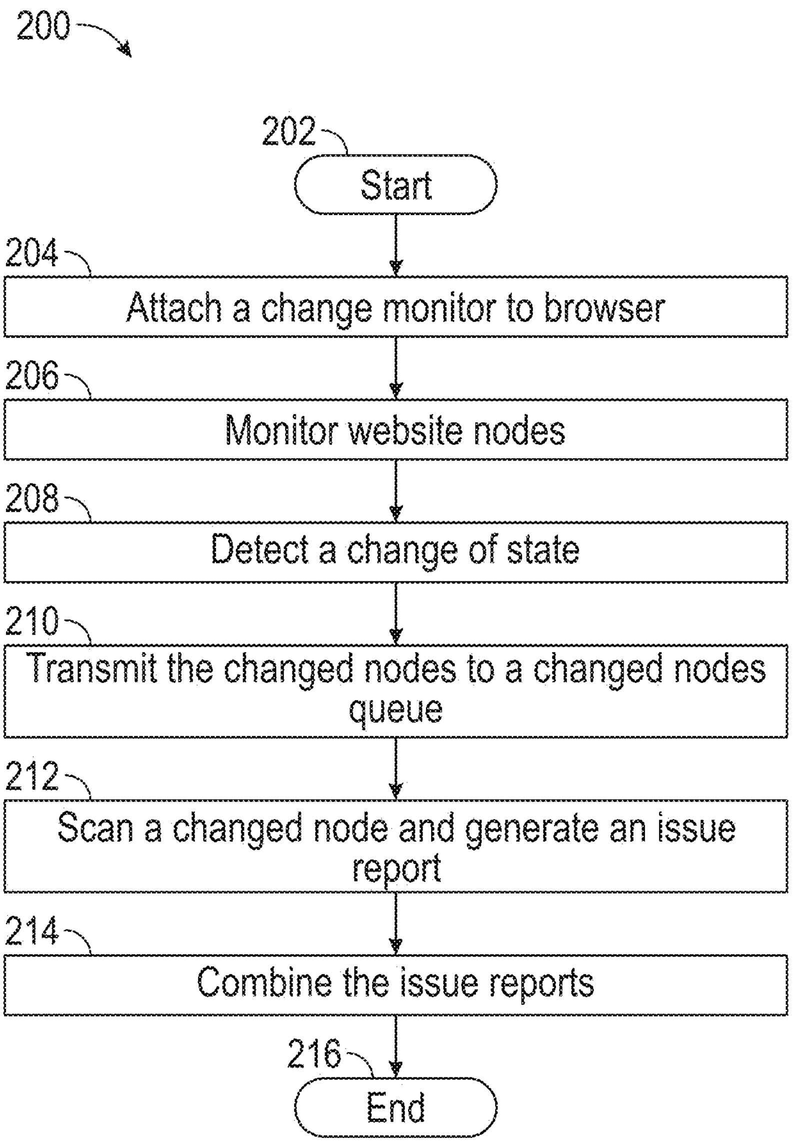
FIG. 2 illustrates a flowchart of an example method of operations of an issue detector and an issue processor, according to an embodiment.

FIG. 2 illustrates a flowchart of an example method 200 of operations of an issue detector and an issue processor, according to an embodiment. The method starts at step 202. At step 204, a change monitor is attached to a browser. At step 206, the change monitor can monitor the nodes of a document object model (DOM) of a website, running on the browser. At step 208, a change in the state of the website is detected. The change in state can correspond to a change to one or more user interface (UI) elements of the website, or any other events in the execution of the website, changing the display or operation parameters of the website. In some embodiments, the change in state can be detected by detecting a DOM change of the website, where one or more nodes and/or sub-nodes of the website are changed. At step 210, the changed nodes are transmitted to a changed nodes queue. At step 212, a rule engine can scan the changed nodes, one node at a time, and generate an issue report for each changed node. At step 214, an issue processor receives the issue reports from the rule engine and combines them into one or more combined reports. The issue processor can perform deduplication, by maintaining only one instance of duplicative issues in the issue reports. The issue processor can also perform component tagging by bucketizing each issue, based on the website component to which each issue relates. The method ends at step 216.

Figure 3:
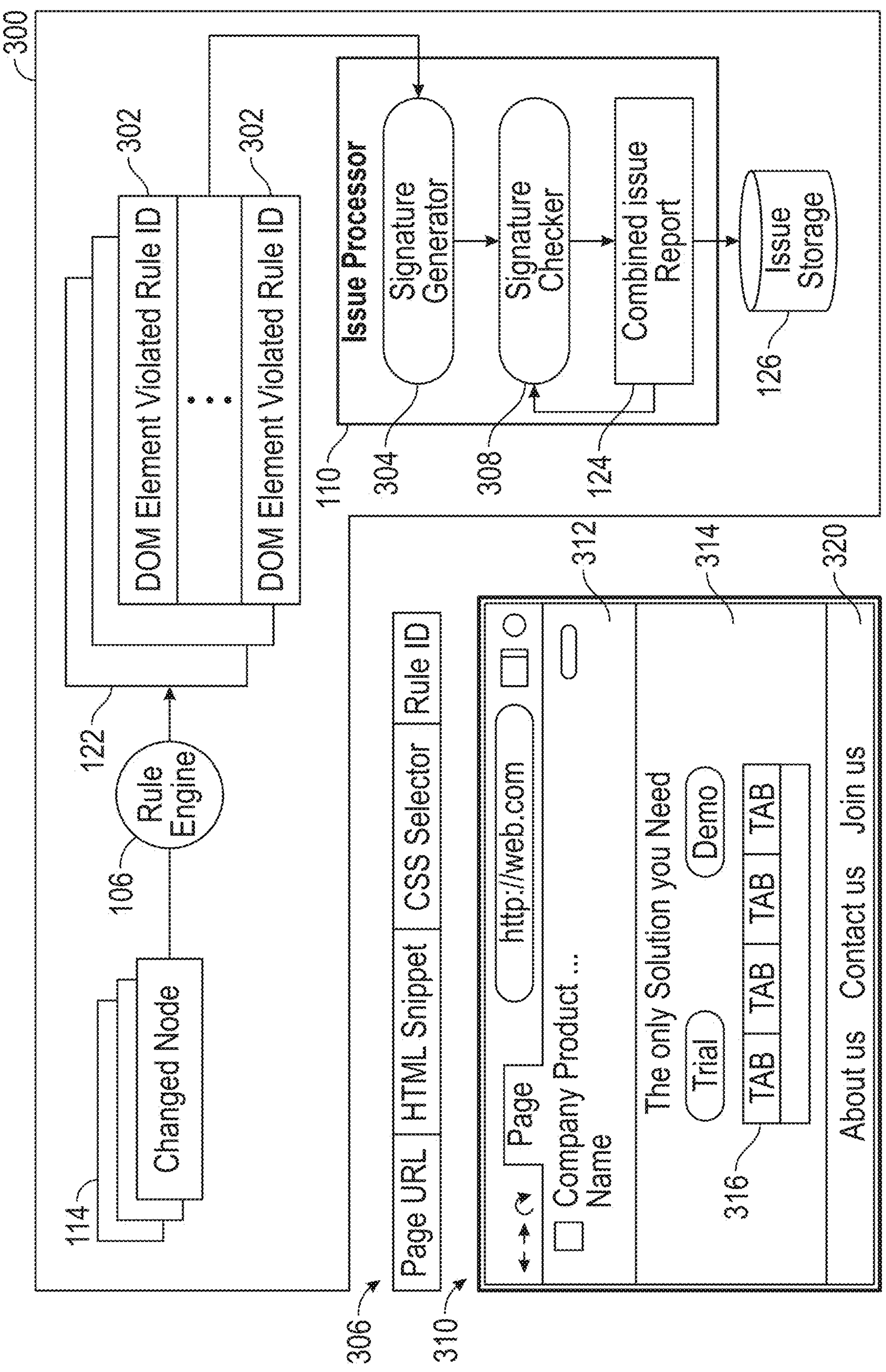
FIG. 3 illustrates an example block diagram of an embodiment, directed to issue deduplication in a combined issue report, an example of a signature, used in a deduplication process, and an example of a website, where issue duplication can occur.

FIG. 3 illustrates an example block diagram 300 of an embodiment, directed to issue deduplication in the combined issue report 124, an example of a signature 306, used in the deduplication process, and an example of a website 310, where issue duplication can occur. The rule engine 106 can process the changed nodes 114 and generate issue reports 122. Each issue report 122 corresponds to a changed node 112. In some embodiments, the issue report can contain a table, or other data structure listing pairings of DOM elements of the website and a rule identifier of a rule violated by the DOM element. The issue processor 110 can receive the issue reports 122, where each issue report contains one or more rows 302 of the pairings of DOM elements of the website and an identifier of the rule, violated by the DOM element. The details of the rule identifier can depend on the implementation of the rule engine 106, and how the rule engine 106 selects to identify and communicate a rule that is violated by a DOM element. For example, some rule engines 106 can utilize a string. As an example, a developer can look up the violated rule by reviewing and/or searching a specification table of the rule engine 106.

A signature generator 304 can generate a signature associated with each row 302 in the issue report 122. The details of the signature can depend on the implementation and can vary between the different embodiments. As an example, a signature 306 can include a page uniform resource locator (URL), hypertext markup language (HTML) snippet, cascading style sheets (CSS) selector and rule identifier. These set of parameters can be derived from a row 302 and can uniquely identify, in a website element or section where a violation of the rule occurred. In other words, the signature can be generated based on the items in a row 302 of an issue report 122, such that there is a one-to-one correspondence between the combination of the items in a row 302 and a corresponding signature. In this manner, if a row 302 within the same issue report 122, or within multiple issue reports 122 are identical, the identical rows yield an identical signature, and refer to the same place and same element in the website. The issue processor 110 combines the rows 302 from multiple issue reports 122, but it only records one instance of rows, having identical signatures. In this manner the issue processor 110 can generates the combined issue report 124 and stores it in an issue storage 126. In some embodiments, the issue processor 110 can receive the issue reports 122 on a rolling basis. A signature checker 308 can search the combined issue report 124 against the signature of an incoming row 302. If an item in the combined issue report with the same signature is previously stored in the combined issue report 124, the issue processor 110 does not record the item in the combined issue report 124, thereby preventing or reducing duplicative entries in the combined issue report. 124.

An example of deduplication can occur when a webpage 310 contains a header section 312, a mid-page section 314 and a footer section 320. The mid-page section 314 can contain a tabbed text box 316, containing multiple tabs. Each time a tab is clicked, the text information in the tabbed text box 316 changes, but the remainder of the webpage 310 is unchanged. For example, the header section 312 and the footer section 320 do not change when a tabbed in the tabbed text box 316 is clicked. Nevertheless, clicking of a tab changes the state of the webpage 310. When rule engine 106 processes each state, it records issues corresponding to all sections of the webpage 310, including the unchanged sections in each issue report 122, corresponding to a state. Deduplication as described above removes, or reduces the duplicative entries corresponding to, for example the header section 312 and the footer section 320, from the combined issue report 124.

Figure 4:
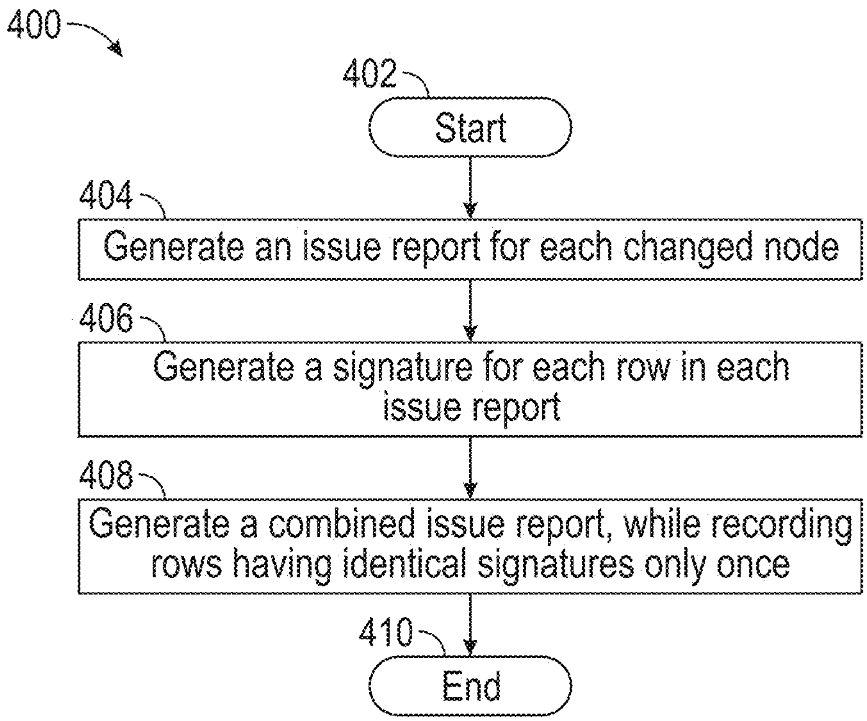
FIG. 4 illustrates a flowchart of an example deduplication method according to an embodiment.

FIG. 4 illustrates a flowchart of an example deduplication method 400 according to an embodiment. The method starts at step 402. At step 404, the rule engine 106 generates an issue report 122 for each changed node 114. At step 406, the issue processor 110 generates a signature for each row in each issue report 122. At step 408, the issue processor 110 generates a combined issue report 124 by appending the rows from each issue report 122, while recording rows, having identical signatures, only once in the combined issue report 124. The method ends at step 410.

Besides issue deduplication, website developers can benefit from categorization and organization of the issues to help them determine the distribution and severity of the issues affecting their websites. The described embodiments include features related to categorization and organization of issues, where related issues can be grouped together and presented to a website developer, in one or more UI elements. Some embodiments include component tagging, or bucketizing issues, based on a website component. Components refer to the building blocks of a website. There are a variety of ways a website developer can generate or use components or building blocks for constructing a website. For example, in some embodiments, components can include an HTML tag and an HTML class. HTML tags define how the browser 102 formats, generates, and ultimately displays the website 104. A button on a webpage of a website can be defined by an HTML tag. Classes define the presentation of an HTML element. In this scenario, the HTML tag and the HTML class define a user interface element of a website that can be repeatedly used as a building block or component of the website. Stated otherwise, components are reused building blocks of the website. Any issue, or rule violating or affecting a component propagates through anywhere in the website, which that component is used in building the website. In the context of accessibility rules, for example, if a component defining a button has too low of a contrast, any place on the website which uses that button component, will be in violation of an accessibility rule, requiring sufficient contrast for all UI elements.

Figure 5:
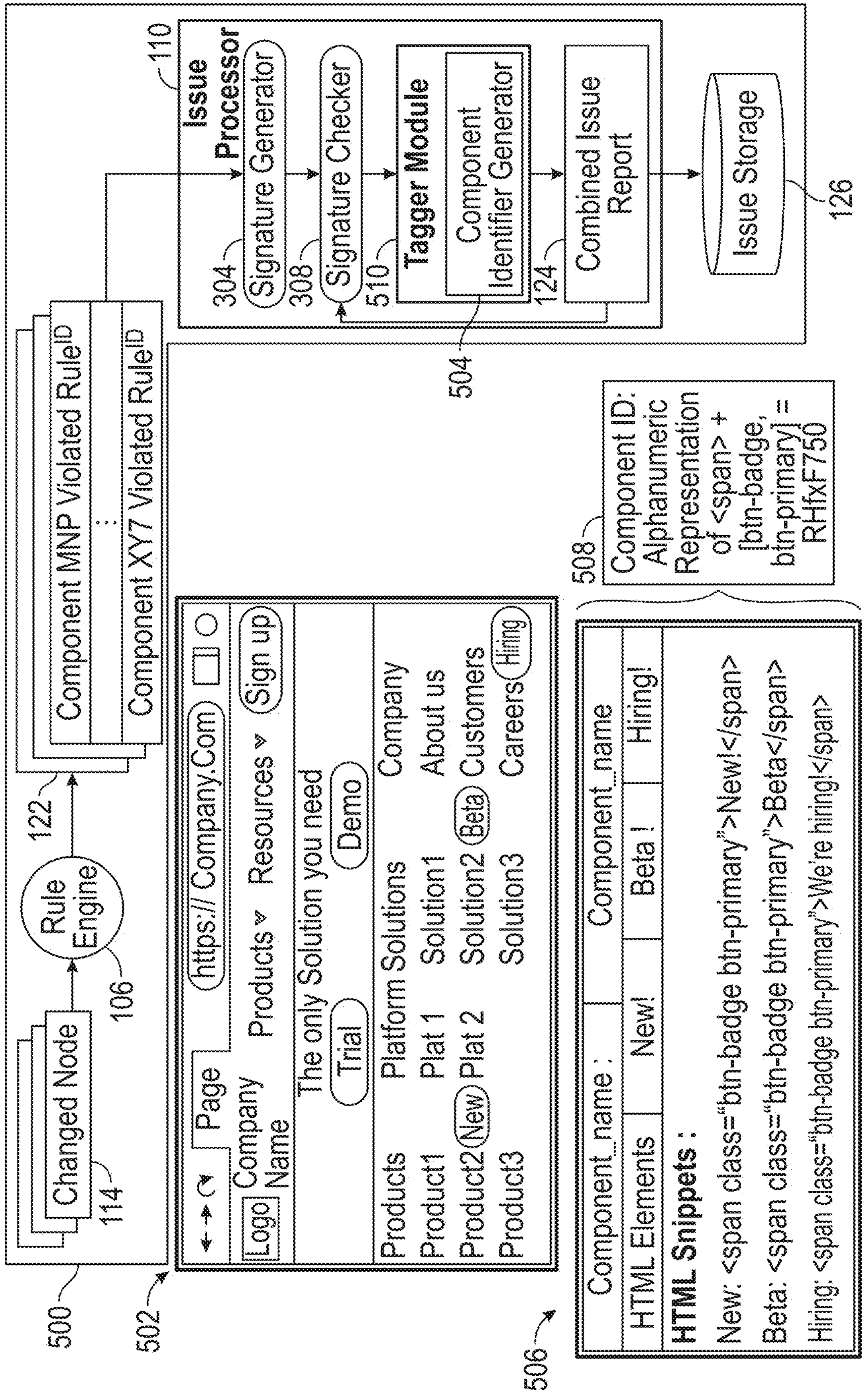
FIG. 5 illustrates an example block diagram of an embodiment, directed to component tagging for organizing the issues in a combined issue report, an example website to illustrate the role of components in a webpage, relative to the embodiments of component tagging, and an example component and its corresponding component identifier.

FIG. 5 illustrates an example block diagram 500 of an embodiment, directed to component tagging for organizing the issues in the combined issue report 124, an example website 502 to illustrate the role of components in a webpage, relative to the embodiments of component tagging, and an example component and its corresponding component identifier. The webpage 502 is built using a combination of UI components. These can include a logo, top level menus, text, various buttons and many more. Components can be reused throughout the website as building blocks of the website, where the components share the same attributes, such as having the same name (e.g., HTML tag) and the same style (e.g., HTML class). An example UI element, implemented by the same component in the webpage 502 are the button badges, "New," "Beta," and "Hiring" button badges, visible in the footer section of the webpage 502. The button badges, while displaying different texts and appearing in different locations on the webpage 502, are built using the same component, sharing the same attributes, such as name and presentation style. Therefore, an issue with the button badges component affects all button badges, wherever they may appear on the webpage 502.

The rule engine 106 can process the changed nodes 114 and can generate an issue report 122 for each changed node 114. The issue report 122 can include pairings of components and the rules those components violated. In some embodiments, the component level rule violation can be embedded in, or extractable, from pairings of DOM element/violated rule identifier data structure. Consequently, the rows in each issue report 122 can include components used as building blocks in the construction of the website 502. A signature generator 304 and a signature checker 308 can be used to reduce or prevent storage of duplicate items in the combined issue report 124.

A component identifier generator 504 can generate a string, based on the attributes of each component. In some embodiments, the component attributes can include a name of the component (e.g., an HTML tag) and a style of the component (e.g., an HTML class). The style can include program code that directs a browser to render the display of the component according to the definitions outlined in the style. In some embodiments, the component identifier can be a string, for example, an alpha, numeric string that has a one-to-one correspondence with the component it identifies. The diagram 506 is an example of a component of the website 502, used to build button badges, "New," "Beta," and "Hiring." HTML snippets for each button is listed in the diagram 506. In this example, the attributes of the component, include the HTML tag, "<span>," and the HTML class, "[btn-badge, btn-primary]." The component and its attributes are reused everywhere in the webpage 502 that the button badges are used. The component identifier generator 504 can generate a component identifier 508, "RHfxF750," based on the attributes of the component. For example, the component name, and portions of the HTML snippets that are reused between the different button badges can be used to generate a string as a component identifier. In other embodiments, other attributes of the component, in addition to or in lieu of the attributes above, can be used to generate the component identifier 508. In other embodiments, the component identifier generator 504 can include a logic module (not shown), which receives a webpage attributes, context, or other characteristics, and identifies a corresponding component identifier. In some embodiments, the logic module can include an artificial intelligence (AI) algorithm that can map the received characteristics to a vocabulary, made of components identifiers.

A tagger module 510 can tag each component in the combined issue report 124 with the component identifier 508. The tagging can occur before storing the component in the combined issue report 124. In other embodiments, the tagger module 510 can parse the entries in the combined issue report 124 and tag each component with a component identifier 508. The violated rule is not part of the component identifier 508. In this manner, the components can be bucketized or tagged based on one or more rule violations. In other words, a component can be in violation of multiple rules, in which case the component appears multiple times in one or more issue reports 122. Nevertheless, in each instance, the component is tagged with the same component identifier 508, allowing a filtering function of the UI 128 to tally and display all components violating a rule. Tallying and component tagging also provides the website developer with data to efficiently prioritize troubleshooting of the components that may be the greatest causes of the number of rule violations on their website. In some embodiments, the components in the issue reports can also be tagged by a violated rule identifier to allow for bucketizing the components, based on a violated rule.

Figure 6:
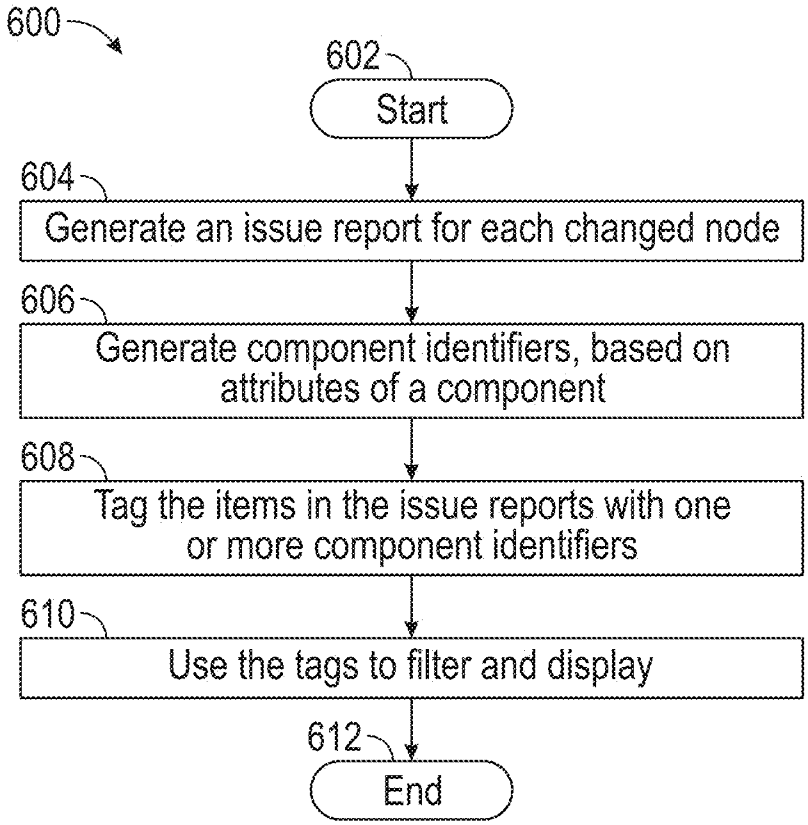
FIG. 6 illustrates a flowchart of an example method of component tagging.

FIG. 6 illustrates a flowchart of an example method 600 of component tagging. The method starts at step 602. At step 604, the rule engine 106 generates an issue report 122 for each changed node. At step 606, the component identifier generator 504 generates a component identifier 508 for each component, based on one or more attributes of each component. The components are the building blocks of the website, and together with their underlying attributes can be reused in multiple locations in the website. Example attributes of a component can include the component name and style. If the website is built using HTML, the attributes can include an HTML tag, and an HTML class. The component identifier can be any data that uniquely identifies the component. For example, in some embodiments, the component identifier 508 can be a string generated, based on one or more attributes of a component. At step 608, the tagger module 510 can tag each component in the issue reports 122 with their corresponding component identifier 508. At step 610, the component identifiers 508 can be used in filtering and displaying all the rules that are violated by a component. The method ends at step 612.

Figure 7:
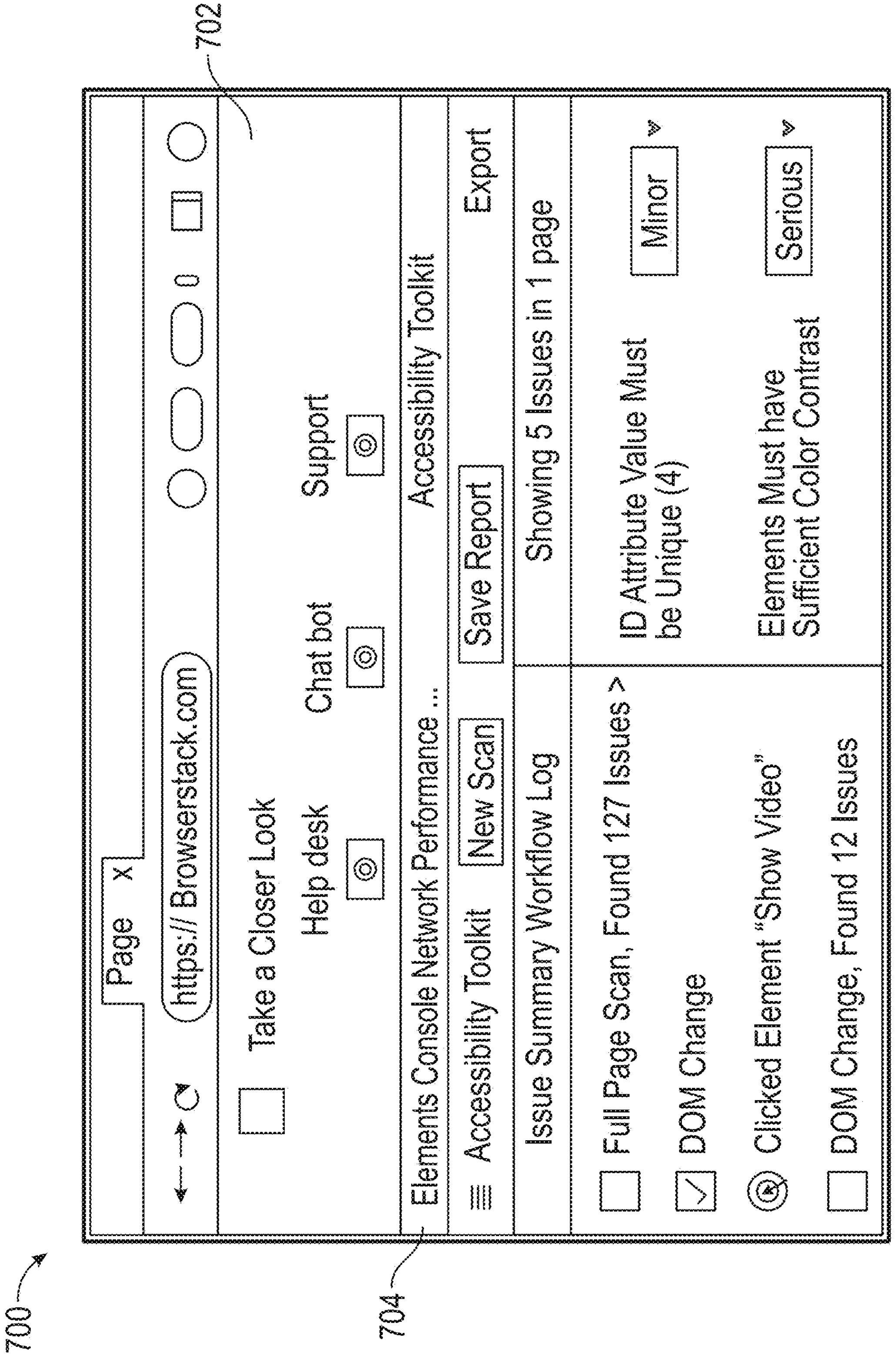
FIGS. 7 and 8 illustrate example screenshots of user interface elements, according to some embodiments.

FIG. 7 illustrates an example screenshot 700 of the UI 128. A website developer can access an "Accessibility toolkit" built using the described embodiments. The website developer can use a mouse right click to select, "inspect," anywhere on the webpage 702, invoking the developer tabs 704. "Accessibility toolkit" can be an option in the developer tabs 704. When selected, options, displays and menus, related to issue detection can be available to the website developer. For example, the website developer can select a button, "New scan," to start scanning. The trigger module 118 signals the start of operations of the change monitor 112, as described above. Various issues, for example accessibility issues in this example, are detected, and used to generate the "Issue summary" report. The issue summary report can present the website events on one column and a description of the detected issues on another column. Some rows can be selectable for further filtering. For example, "DOM change" option can filter the issue summary report to show the issues detected for DOM changes. The rule engine 106 can also generate a severity message along with a detected issue. Example levels of severity can be displayed with colorcoded buttons, such as "minor," "serious," "critical," and the like. The website developer can utilize the severity information to triage the issues. A "save report" button can allow the website developer to save a report to the cloud or to the local computer, running the browser. The saved report can be accessed from a browser-accessible dashboard UI, or by a file explorer on the local computer.

Figure 8:
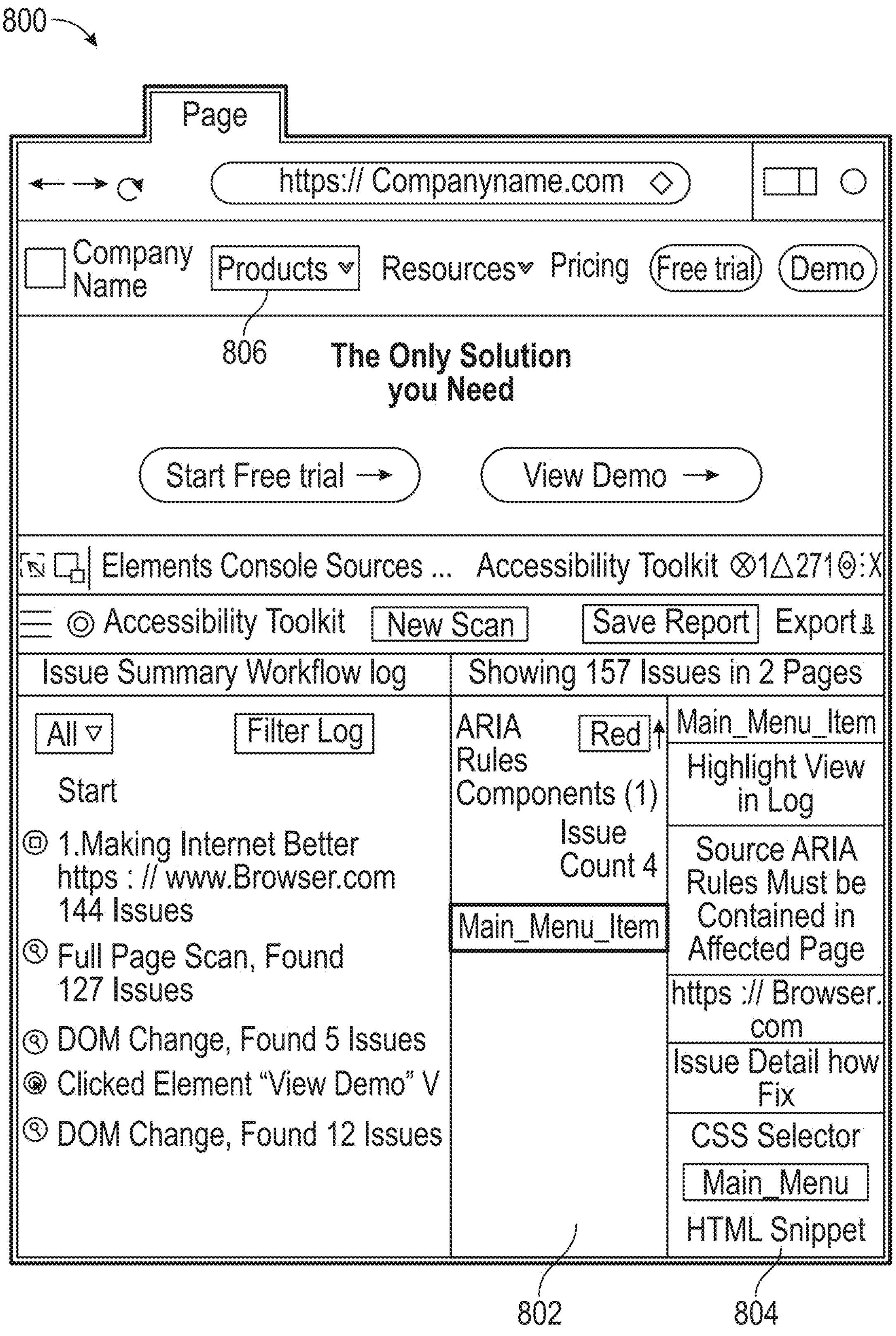

FIG. 8 illustrates another example screenshot 800 of the UI 128. The website developer can click on a component, for example, "main_menu_item," in the middle column 802, and display a description of the issues related to this component. In this example, 4 issues are detected. The website developer can choose the option, "Highlight view," on the right column 804. The "Accessibility toolkit," highlights where the issue has been detected on the webpage, by for example, placing a rectangle or an outline 806 around the website element violating the rule. Alternatively, the website developer can copy an HTML snippet from the right column 804 to access the affected website element. In this manner, the UI 128 provides various reports and tools for triaging and troubleshooting the issues with a website.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 9:
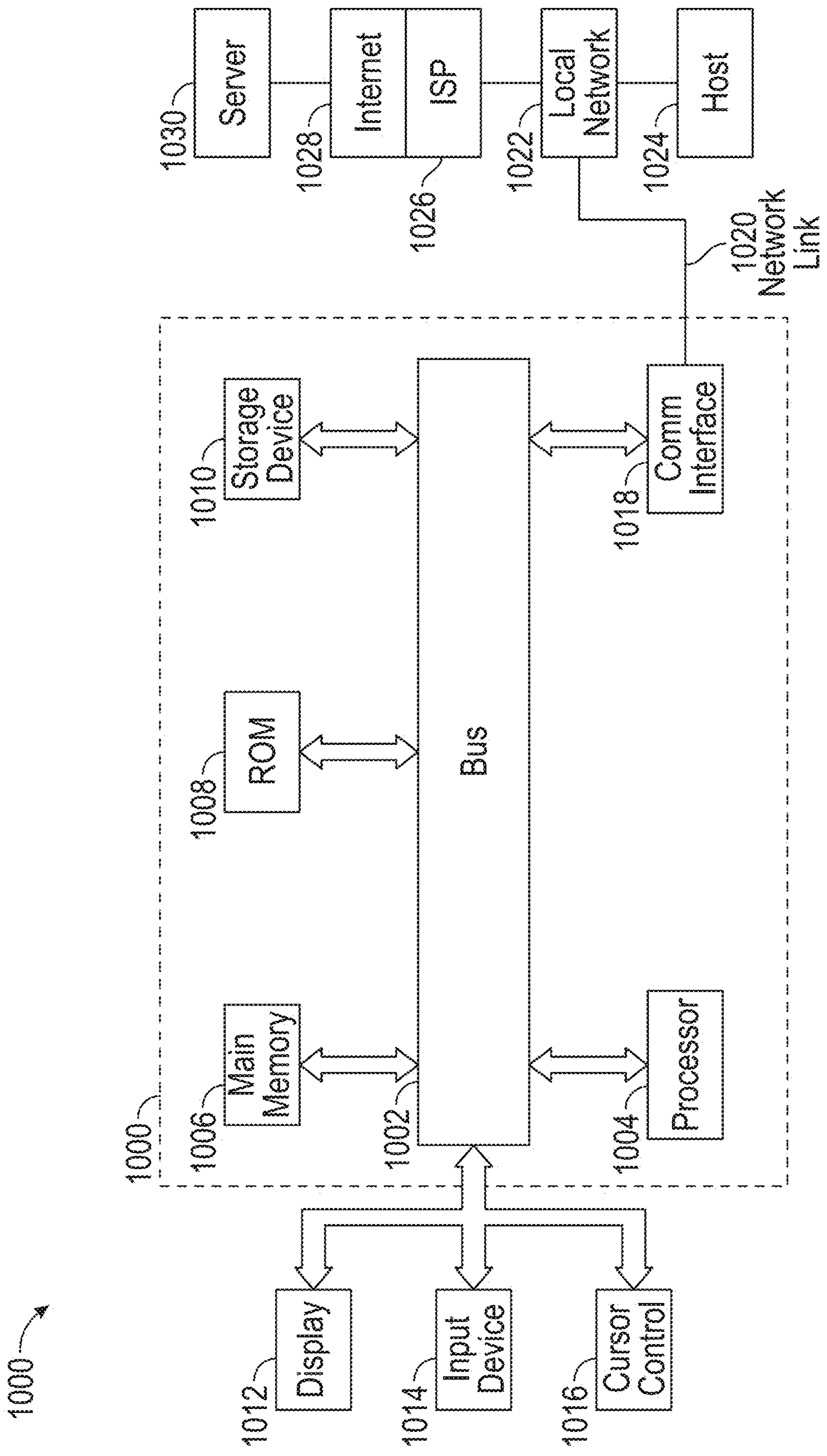
FIG. 9 illustrates an environment in which some embodiments may operate.

For example, FIG. 9 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: attaching a change monitor to a browser; monitoring nodes of a document object model (DOM) of a website running on the browser; detecting, with the change monitor, a change in a state of the website, the change comprising a DOM change of the website, and affecting one or more nodes of the website; transmitting, via the browser, the changed nodes of the website to a changed nodes queue; scanning, with an accessibility rule engine, the changed nodes in the changed nodes queue, one node at a time; generating an accessibility issue report for each node by verifying compliance of the node with a set of accessibility rules; combining the accessibility issue reports; and generating one or more user interfaces, based at least in part on the combined accessibility issue reports.

Example 2: The method of Example 1, further comprising: the accessibility rule engine, scanning the changed nodes and generating the accessibility issue report, wherein the accessibility rule engine is capable of scanning and generating accessibility issue report for one changed node at a time.

Example 3: The method of some or all of Examples 1 and 2, further comprising: attaching an event listener to the browser; generating an event listener output comprising website events; generating a workflow log by capturing the event listener output; and mapping each item in an accessibility issue report to one or more website events in the workflow log.

Example 4: The method of some or all of Examples 1-3, wherein the change monitor is attached to the website via a browser extension.

Example 5: The method of some or all of Examples 1-4, wherein the DOM change corresponds with the browser receiving a user interaction with the website.

Example 6: A non-transitory computer storage medium that stores executable program instructions that, when executed by one or more computing devices, configure the one or more computing devices to perform operations comprising: attaching a change monitor to a browser; monitoring nodes of a document object model (DOM) of a website running on the browser; detecting, with the change monitor, a change in a state of the website, the change comprising a DOM change of the website, and affecting one or more nodes of the website; transmitting, via the browser, the changed nodes of the website to a changed nodes queue; scanning, with an accessibility rule engine, the changed nodes in the changed nodes queue, one node at a time; generating an accessibility issue report for each node by verifying compliance of the node with a set of accessibility rules; combining the accessibility issue reports; and generating one or more user interfaces, based at least in part on the combined accessibility issue reports.

Example 7: The non-transitory computer storage medium of Example 6, wherein the operations further comprise: the accessibility rule engine, scanning the changed nodes and generating the accessibility issue report, wherein the accessibility rule engine is capable of scanning and generating accessibility issue report for one changed node at a time.

Example 8: The non-transitory computer storage medium of some or all of Examples 6 and 7, wherein the operations further comprise: attaching an event listener to the browser; generating an event listener output comprising website events; generating a workflow log by capturing the event listener output; and mapping each item in an accessibility issue report to one or more website events in the workflow log.

Example 9: The non-transitory computer storage medium of some or all of Examples 6-8, wherein the change monitor is attached to the website via a browser extension.

Example 10: The non-transitory computer storage medium of some or all of Examples 6-9, wherein the DOM change corresponds with the browser receiving a user interaction with the website.

Example 11: A system comprising one or more processors, wherein the one or more processors are configured to perform operations comprising: attaching a change monitor to a browser; monitoring nodes of a document object model (DOM) of a website running on the browser; detecting, with the change monitor, a change in a state of the website, the change comprising a DOM change of the website, and affecting one or more nodes of the website; transmitting, via the browser, the changed nodes of the website to a changed nodes queue; scanning, with an accessibility rule engine, the changed nodes in the changed nodes queue, one node at a time; generating an accessibility issue report for each node by verifying compliance of the node with a set of accessibility rules; combining the accessibility issue reports; and generating one or more user interfaces, based at least in part on the combined accessibility issue reports.

Example 12: The system of Example 11, wherein the operations further comprise: the accessibility rule engine scanning the changed nodes and generating the accessibility issue report, wherein the accessibility rule engine is capable of scanning and generating accessibility issue report for one changed node at a time.

Example 13: The system of some or all of Examples 11 and 12, wherein the operations further comprise: attaching an event listener to the browser; generating an event listener output comprising website events; generating a workflow log by capturing the event listener output; and mapping each item in an accessibility issue report to one or more website events in the workflow log.

Example 14: The system of some or all of Examples 11-13, wherein the change monitor is attached to the website via a browser extension.

Example 15: The system of some or all of Examples 11-14, wherein the DOM change corresponds with the browser receiving a user interaction with the website.

Example 16: A method comprising: attaching a change monitor to a browser; monitoring nodes of a document object model (DOM) of a website running on the browser; detecting, with the change monitor, a change in a state of the website, the change comprising a DOM change of the website, and affecting one or more DOM nodes of the website; transmitting, via the browser, the changed nodes of the website to a changed nodes queue; scanning, with an accessibility engine, the changed nodes in the changed nodes queue, one node at a time; generating an accessibility issue report for each changed node by verifying compliance of the changed node with a set of accessibility rules, wherein the issue report comprises one or more items, each item comprising one pair of a DOM element and an identifier of an accessibility rule violated by the DOM element; generating a signature for each item in each accessibility issue report, based at least in part on attributes of the DOM element and the accessibility rule identifier in the item; generating a combined accessibility issue report by recording the pairs of DOM elements and the accessibility rule identifiers in a combined accessibility issue report, while recording only one entry for accessibility issue report items, sharing an identical signature.

Example 17: The method of Example 16, wherein the signature comprises one or more of a uniform resource locator (URL) of a page, an HTML snippet of the portion of the page violating the accessibility rule, a cascading style sheets (CSS) selector, and the accessibility rule identifier.

Example 18: The method of some or all of Examples 16 and 17, further comprising: receiving additional accessibility issue reports; and continuously updating the combined accessibility issue report by appending accessibility issue report items, having signatures not previously recorded in the combined accessibility issue report.

Example 19: The method of some or all of Examples 16-18, further comprising: identifying re-used website components in the combined accessibility issue report; generating a component identifier for the re-used website components; and tagging the combined accessibility issue report with the component identifier.

Example 20: A non-transitory computer storage medium that stores executable program instructions that, when executed by one or more computing devices, configure the one or more computing devices to perform operations comprising: attaching a change monitor to a browser; monitoring nodes of a document object model (DOM) of a website running on the browser; detecting, with the change monitor, a change in a state of the website, the change comprising a DOM change of the website, and affecting one or more DOM nodes of the website; transmitting, via the browser, the changed nodes of the website to a changed nodes queue; scanning, with an accessibility engine, the changed nodes in the changed nodes queue, one node at a time; generating an accessibility issue report for each changed node by verifying compliance of the changed node with a set of accessibility rules, wherein the issue report comprises one or more items, each item comprising one pair of a DOM element and an identifier of an accessibility rule violated by the DOM element; generating a signature for each item in each accessibility issue report, based at least in part on attributes of the DOM element and the accessibility rule identifier in the item; generating a combined accessibility issue report by recording the pairs of DOM elements and the accessibility rule identifiers in a combined accessibility issue report, while recording only one entry for accessibility issue report items, sharing an identical signature.

Example 21: The non-transitory computer storage medium of Example 20, wherein the signature comprises one or more of a uniform resource locator (URL) of a page, an HTML snippet of the portion of the page violating the accessibility rule, a cascading style sheets (CSS) selector, and the accessibility rule identifier.

Example 22: The non-transitory computer storage medium of some or all of Examples 20 and 21, wherein the operations further comprise: receiving additional accessibility issue reports; and continuously updating the combined accessibility issue report by appending accessibility issue report items, having signatures not previously recorded in the combined accessibility issue report.

Example 23: The non-transitory computer storage medium of some or all of Examples 20-22, wherein the operations further comprise: identifying re-used website components in the combined accessibility issue report; generating a component identifier for the reused website components; and tagging the combined accessibility issue report with the component identifier.

Example 24: A system comprising one or more processors, wherein the one or more processors are configured to perform operations comprising: attaching a change monitor to a browser; monitoring nodes of a document object model (DOM) of a website running on the browser; detecting, with the change monitor, a change in a state of the website, the change comprising a DOM change of the website, and affecting one or more DOM nodes of the website; transmitting, via the browser, the changed nodes of the website to a changed nodes queue; scanning, with an accessibility engine, the changed nodes in the changed nodes queue, one node at a time; generating an accessibility issue report for each changed node by verifying compliance of the changed node with a set of accessibility rules, wherein the issue report comprises one or more items, each item comprising one pair of a DOM element and an identifier of an accessibility rule violated by the DOM element; generating a signature for each item in each accessibility issue report, based at least in part on attributes of the DOM element and the accessibility rule identifier in the item; generating a combined accessibility issue report by recording the pairs of DOM elements and the accessibility rule identifiers in a combined accessibility issue report, while recording only one entry for accessibility issue report items, sharing an identical signature.

Example 25: The system of Example 24, wherein the signature comprises one or more of a uniform resource locator (URL) of a page, an HTML snippet of the portion of the page violating the accessibility rule, a cascading style sheets (CSS) selector, and the accessibility rule identifier.

Example 26: The system of some or all of Examples 24 and 25, wherein the operations further comprise: receiving additional accessibility issue reports; and continuously updating the combined accessibility issue report by appending accessibility issue report items, having signatures not previously recorded in the combined accessibility issue report.

Example 27: The system of some or all of Examples 24-26, wherein the operations further comprise: identifying re-used website components in the combined accessibility issue report; generating a component identifier for the re-used website components; and tagging the combined accessibility issue report with the component identifier.

Example 28: A method comprising: attaching a change monitor to a browser; monitoring nodes of a document object model (DOM) of a website running on the browser; detecting, with the change monitor, a change in a state of the website, the change comprising a DOM change of the website, and affecting one or more DOM nodes of the website; transmitting, via the browser, the changed nodes of the website to a changed nodes queue; scanning, with an accessibility engine, the changed nodes in the changed nodes queue, one node at a time; generating an accessibility issue report for each changed node by verifying compliance of the changed node with a set of accessibility rules, wherein the issue report comprises one or more items, each item comprising one pair of a DOM element and an identifier of an accessibility rule violated by the DOM element, wherein each DOM element comprises at least a component, used in building the website, wherein the component comprises one or more attributes; generating a component identifier, based at least in part on the attributes of the component; and tagging the items in the accessibility issue reports with one or more component identifiers.

Example 29: The method of Example 28, further comprising: generating a combined accessibility issue report by appending the accessibility issue reports together.

Example 30: The method of some or all of Examples 28 and 29, wherein the component is reused in more than one location in the website, wherein the reused components share the same attributes.

Example 31: The method of some or all of Examples 28-30, wherein the one or more component attributes comprise an HTML tag, an HTML class name, and generating the component identifier further comprises generating a random alphanumeric string, based on the HTML tag and the HTML class name.

Example 32: The method of some or all of Examples 28-31, further comprising: generating a signature for each item in each accessibility issue report, based at least in part on attributes of the DOM element and the accessibility rule identifier in the item; and generating a combined accessibility issue report by recording the pairs of DOM elements and the accessibility rule identifiers in a combined accessibility issue report, while recording only one entry for accessibility issue report items, sharing an identical signature.

Example 33: A non-transitory computer storage medium that stores executable program instructions that, when executed by one or more computing devices, configure the one or more computing devices to perform operations comprising: attaching a change monitor to a browser; monitoring nodes of a document object model (DOM) of a website running on the browser; detecting, with the change monitor, a change in a state of the website, the change comprising a DOM change of the website, and affecting one or more DOM nodes of the website; transmitting, via the browser, the changed nodes of the website to a changed nodes queue; scanning, with an accessibility engine, the changed nodes in the changed nodes queue, one node at a time; generating an accessibility issue report for each changed node by verifying compliance of the changed node with a set of accessibility rules, wherein the issue report comprises one or more items, each item comprising one pair of a DOM element and an identifier of an accessibility rule violated by the DOM element, wherein each DOM element comprises at least a component, used in building the website, wherein the component comprises one or more attributes; generating a component identifier, based at least in part on the attributes of the component; and tagging the items in the accessibility issue reports with one or more component identifiers.

Example 34: The non-transitory computer storage medium of Example 33, wherein the operations further comprise: generating a combined accessibility issue report by appending the accessibility issue reports together.

Example 35: The non-transitory computer storage medium of some or all of Examples 33 and 34, wherein the component is reused in more than one location in the website, wherein the reused components share the same attributes.

Example 36: The non-transitory computer storage medium of some or all of Examples 33-35, wherein the one or more component attributes comprise an HTML tag, an HTML class name, and generating the component identifier further comprises generating a random alphanumeric string, based on the HTML tag and the HTML class name.

Example 37: The non-transitory computer storage medium of some or all of Examples 33-36, wherein the operations further comprise: generating a signature for each item in each accessibility issue report, based at least in part on attributes of the DOM element and the accessibility rule identifier in the item; and generating a combined accessibility issue report by recording the pairs of DOM elements and the accessibility rule identifiers in a combined accessibility issue report, while recording only one entry for accessibility issue report items, sharing an identical signature.

Example 38: A system comprising one or more processors, wherein the one or more processors are configured to perform operations comprising: attaching a change monitor to a browser; monitoring nodes of a document object model (DOM) of a website running on the browser; detecting, with the change monitor, a change in a state of the website, the change comprising a DOM change of the website, and affecting one or more DOM nodes of the website; transmitting, via the browser, the changed nodes of the website to a changed nodes queue; scanning, with an accessibility engine, the changed nodes in the changed nodes queue, one node at a time; generating an accessibility issue report for each changed node by verifying compliance of the changed node with a set of accessibility rules, wherein the issue report comprises one or more items, each item comprising one pair of a DOM element and an identifier of an accessibility rule violated by the DOM element, wherein each DOM element comprises at least a component, used in building the website, wherein the component comprises one or more attributes; generating a component identifier, based at least in part on the attributes of the component; and tagging the items in the accessibility issue reports with one or more component identifiers.

Example 39: The system of Example 38, wherein the operations further comprise: generating a combined accessibility issue report by appending the accessibility issue reports together.

Example 40: The system of some or all of Examples 38 and 39, wherein the component is reused in more than one location in the website, wherein the reused components share the same attributes.

Example 41: The system of some or all of Examples 38-40, wherein the one or more component attributes comprise an HTML tag, an HTML class name, and generating the component identifier further comprises generating a random alphanumeric string, based on the HTML tag and the HTML class name.

Example 42: The system of some or all of Examples 38-41, wherein the operations further comprise: generating a signature for each item in each accessibility issue report, based at least in part on attributes of the DOM element and the accessibility rule identifier in the item; and generating a combined accessibility issue report by recording the pairs of DOM elements and the accessibility rule identifiers in a combined accessibility issue report, while recording only one entry for accessibility issue report items, sharing an identical signature.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including, hard drives, floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method comprising:
attaching a change monitor to a browser;
monitoring nodes of a document object model (DOM) of a website running on the browser;
detecting, with the change monitor, a change in a state of the website, the change comprising a DOM change of the website, and affecting one or more nodes of the website;
transmitting, via the browser, changed nodes of the website to a changed nodes queue;
scanning, with an accessibility rule engine, the changed nodes in the changed nodes queue, one changed node at a time;
generating an accessibility issue report for each changed node by verifying compliance of the changed node with a set of accessibility rules;
combining the accessibility issue reports; and
generating one or more user interfaces, based at least in part on the combined accessibility issue reports.

2. The method of claim 1, further comprising:
the accessibility rule engine, scanning the changed nodes and generating the accessibility issue report, wherein the accessibility rule engine is capable of scanning and generating an accessibility issue report for one changed node at a time.

3. The method of claim 1, further comprising:
attaching an event listener to the browser;
generating an event listener output comprising website events;
generating a workflow log by capturing the event listener output; and
mapping each item in an accessibility issue report to one or more website events in the workflow log.

4. The method of claim 1, wherein the change monitor is attached to the website via a browser extension.

5. The method of claim 1, wherein the DOM change corresponds with the browser receiving a user interaction with the website.

6. The method of claim 1, further comprising:
generating a signature for each item in each accessibility issue report based on attributes of a document object model (DOM) element associated with an item and an identifier of an accessibility rule violated by the DOM element, wherein combining the accessibility issue reports comprises recording only a single entry for accessibility issue report items sharing an identical signature.

7. The method of claim 6, wherein the signature comprises a uniform resource locator (URL) of a webpage, a hypertext markup language (HTML) snippet of a portion of the webpage violating the accessibility rule, a cascading style sheets (CSS) selector, and the accessibility rule identifier.

8. The method of claim 1, further comprising:
identifying reused website components within the combined accessibility issue reports, wherein each website component comprises one or more attributes;
generating a component identifier for each identified website component based on the one or more attributes; and
tagging items in the accessibility issue reports with corresponding component identifiers to bucketize accessibility issues, based on website components.

9. The method of claim 8, wherein the one or more attributes of the website component comprise a hypertext markup language (HTML) tag and an HTML class name, wherein generating the component identifier comprises generating an alphanumeric string based on the HTML tag and the HTML class name.

10. The method of claim 1, wherein generating the one or more user interfaces comprises displaying a list of detected issues grouped by website components, and, in response to a user selection of a website component, visually highlighting a location on a website where an issue associated with the selected website component was detected by rendering an outline around a corresponding website element.

11. A non-transitory computer readable storage medium that stores executable program instructions that, when executed by one or more computing devices, configure the one or more computing devices to perform operations comprising:
attaching a change monitor to a browser;
monitoring nodes of a document object model (DOM) of a website running on the browser;
detecting, with the change monitor, a change in a state of the website, the change comprising a DOM change of the website, and affecting one or more nodes of the website;
transmitting, via the browser, changed nodes of the website to a changed nodes queue;
scanning, with an accessibility rule engine, the changed nodes in the changed nodes queue, one changed node at a time;
generating an accessibility issue report for each changed node by verifying compliance of the changed node with a set of accessibility rules;
combining the accessibility issue reports; and
generating one or more user interfaces, based at least in part on the combined accessibility issue reports.

12. The non-transitory computer readable storage medium of claim 11, wherein the operations further comprise:
the accessibility rule engine, scanning the changed nodes and generating the accessibility issue report, wherein the accessibility rule engine is capable of scanning and generating an accessibility issue report for one changed node at a time.

13. The non-transitory computer readable storage medium of claim 11, wherein the operations further comprise:
attaching an event listener to the browser;
generating an event listener output comprising website events;
generating a workflow log by capturing the event listener output; and
mapping each item in an accessibility issue report to one or more website events in the workflow log.

14. The non-transitory computer readable storage medium of claim 11, wherein the change monitor is attached to the website via a browser extension.

15. The non-transitory computer readable storage medium of claim 11, wherein the DOM change corresponds with the browser receiving a user interaction with the website.

16. A system comprising one or more processors, wherein the one or more processors are configured to perform operations comprising:
attaching a change monitor to a browser;
monitoring nodes of a document object model (DOM) of a website running on the browser;
detecting, with the change monitor, a change in a state of the website, the change comprising a DOM change of the website, and affecting one or more nodes of the website;
transmitting, via the browser, changed nodes of the website to a changed nodes queue;

scanning, with an accessibility rule engine, the changed nodes in the changed nodes queue, one changed node at a time;

generating an accessibility issue report for each changed node by verifying compliance of the changed node with a set of accessibility rules;

combining the accessibility issue reports; and generating one or more user interfaces, based at least in part on the combined accessibility issue reports.

17. The system of claim 16, wherein the operations further comprise:

the accessibility rule engine scanning the changed nodes and generating the accessibility issue report, wherein the accessibility rule engine is capable of scanning and generating an accessibility issue report for one changed node at a time.

18. The system of claim 16, wherein the operations further comprise:

attaching an event listener to the browser;

generating an event listener output comprising website events;

generating a workflow log by capturing the event listener output; and mapping each item in an accessibility issue report to one or more website events in the workflow log.

19. The system of claim 16, wherein the change monitor is attached to the website via a browser extension.

20. The system of claim 16, wherein the DOM change corresponds with the browser receiving a user interaction with the website.

* * * * *